(12) United States Patent
Jeong et al.

(10) Patent No.: US 10,778,850 B2
(45) Date of Patent: Sep. 15, 2020

(54) METHOD AND APPARATUS FOR IMPROVING SERVICE EFFICIENCY IN WIRELESS COMMUNICATION SYSTEM

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR); Hyejeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/196,266

(22) Filed: Nov. 20, 2018

(65) Prior Publication Data

US 2019/0089841 A1     Mar. 21, 2019

Related U.S. Application Data

(63) Continuation of application No. 14/762,304, filed as application No. PCT/KR2014/007001 on Jul. 30, 2014, now Pat. No. 10,142,490.

(30) Foreign Application Priority Data

Jul. 30, 2013   (KR) .................. 10-2013-0090381
Sep. 30, 2013   (KR) .................. 10-2013-0116853
(Continued)

(51) Int. Cl.
*H04M 15/00*     (2006.01)
*H04W 40/24*     (2009.01)
(Continued)

(52) U.S. Cl.
CPC .......... *H04M 15/56* (2013.01); *H04M 15/57* (2013.01); *H04M 15/66* (2013.01);
(Continued)

(58) Field of Classification Search
None
See application file for complete search history.

(56) References Cited

U.S. PATENT DOCUMENTS 8,644,824 B1    2/2014 Sigg et al.
2011/0009120 A1 1/2011 You et al.
(Continued)

FOREIGN PATENT DOCUMENTS

EP    2 563 067 A1      2/2013
KR    10-2013-0036598 A  4/2013
(Continued)

OTHER PUBLICATIONS

3GPP, "3rd Generation Partnership Project", Technical Specification Group Core Network and Terminals, Non-Access-Stratum (NAS) protocol for Evolved Packet System (EPS), Stage 3 (Release 8), XP055334887, Mar. 31, 2009.

(Continued)

*Primary Examiner* — Jutai Kao
(74) *Attorney, Agent, or Firm* — Jefferson IP Law, LLP

(57) ABSTRACT

Disclosed are a method and an apparatus for selecting a domain for a voice call in a mobile communication network. A terminal, which uses VoLTE, receives, from a network, identification information indicating whether IMS Voice over PS (IMS VoPS) is supported, determines whether the network supports IMS VoPS and determines a domain (PS or CS) to which a voice service will be provided through the network according to the determination result.

6 Claims, 15 Drawing Sheets

(30) Foreign Application Priority Data

Nov. 8, 2013 (KR) .................. 10-2013-0135863
Jan. 10, 2014 (KR) .................. 10-2014-0003637

(51) Int. Cl.

| | | |
|---|---|---|
| H04W 48/18 | (2009.01) | |
| H04W 4/24 | (2018.01) | |
| H04W 48/04 | (2009.01) | |
| H04W 4/16 | (2009.01) | |

(52) U.S. Cl.

CPC ......... *H04M 15/8016* (2013.01); *H04W 4/16* (2013.01); *H04W 4/24* (2013.01); *H04W 40/24* (2013.01); *H04W 48/04* (2013.01); *H04W 48/18* (2013.01)

(56) References Cited

U.S. PATENT DOCUMENTS

| | | | |
|---|---|---|---|
| 2011/0207462 A1 | 8/2011 | Hallenstal et al. | |
| 2012/0044867 A1* | 2/2012 | Faccin | H04W 60/00 370/328 |
| 2012/0076121 A1 | 3/2012 | Choi et al. | |
| 2013/0083777 A1 | 4/2013 | Rydnell et al. | |
| 2013/0250909 A1 | 9/2013 | Xie et al. | |
| 2014/0099969 A1* | 4/2014 | Hwang | H04W 76/18 455/453 |
| 2014/0313889 A1 | 10/2014 | Jeong et al. | |
| 2015/0092665 A1 | 4/2015 | Choi et al. | |
| 2015/0365851 A1 | 12/2015 | Wang et al. | |
| 2016/0105790 A1* | 4/2016 | Shu | H04W 8/06 455/435.1 |
| 2016/0183156 A1* | 6/2016 | Chin | H04W 36/0022 370/331 |

FOREIGN PATENT DOCUMENTS

| | | |
|---|---|---|
| KR | 10-2013-0046649 A | 5/2013 |
| WO | 2010/044737 A1 | 4/2010 |

OTHER PUBLICATIONS

TSG GERAN WG2, Inter-RAT DTM Handover—Parallel CS and PS Handovers, 3GPP TSG GERAN2 #28 Brussels, Belgium, Jan. 17-19, 2006, pp. 1-10, TDoc GP-060404.

Korean Office Action dated Feb. 18, 2020, issued in Korean Application No. 10-2014-0003637.

\* cited by examiner

METHOD AND APPARATUS FOR IMPROVING SERVICE EFFICIENCY IN WIRELESS COMMUNICATION SYSTEM

CROSS-REFERENCE TO RELATED APPLICATION(S)

This application is a continuation application of prior application Ser. No. 14/762,304, filed on Jul. 21, 2015, which was a U.S. National Stage application under 35 U.S.C. § 371 of an International application number PCT/KR2014/007001, filed on Jul. 30, 2014, and was based on and claimed priority under 35 U.S.C. § 119(a) of a Korean patent application number 10-2013-0090381, filed on Jul. 30, 2013, in the Korean Intellectual Property Office, of a Korean patent application number 10-2013-0116853, filed on Sep. 30, 2013, in the Korean Intellectual Property Office, of a Korean patent application number 10-2013-0135863, filed on Nov. 8, 2013, in the Korean Intellectual Property Office, and of a Korean patent application number 10-2014-0003637, filed on Jan. 10, 2014, in the Korean Intellectual Property Office, the disclosure of which is incorporated by reference herein in its entirety.

BACKGROUND

1. Field

The present invention relates to a cell selection method and apparatus for providing a terminal with a specific service, e.g. voice service, seamlessly in a mobile communication system.

The present invention relates to handover control in a mobile communication system and, in particular, to a handover method and apparatus of improving efficiency of measurement required for handover and transmission/reception power control and reducing battery power consumption of the terminal.

2. Description of Related Art

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

As one of the next-generation mobile communication systems to meet such requirements, standardization for a Long Term Evolution (LTE) system is underway in the 3rd Generation Partnership Project (3GPP). LTE is a technology designed to provide high speed packet-based communication of up to 100 Mbps and aims at commercial deployment around 2010 timeframe. In order to accomplish the aim, a discussion is being held on several schemes: one scheme for reducing the number of nodes located in a communication path by simplifying a configuration of the network, and another scheme for maximally approximating wireless protocols to wireless channels.

FIG. 1 is a diagram illustrating the general LTE mobile communication system architecture.

Referring to FIG. 1, the radio access network of the LTE mobile communication system includes an evolved Node B (eNB) (hereinafter, referred to as Node B or E-UTRAN interchangeably) 110, a Mobility Management Entity (MME) 120, and a Serving Gateway (S-GW) 130. The User Equipment (UE) 100 connects to an external network through the eNB 110, S-GW 130, and PDN Gateway (P-GW) 160.

The eNB 110 is a Radio Access Network (RAN) node and corresponds to Radio Network Controller (RNC) of Universal Terrestrial Radio Access Network (UTRAN) system and Base Station Controller (BSC) of GSM EDGE Radio Access Network (GERAN) system. The eNB 110 is connected to the UE 100 through radio channel and performs the role similar to the legacy RNC/BSC. The eNB 110 may manage a plurality of cells simultaneously.

In LTE, all the user traffics including the real time service such as Voice over IP (VoIP) are serviced through a shared channel and thus there is a need of a device for gathering the state informations of UEs and scheduling the UEs, eNB being responsible for this.

The MME 120 is an entity responsible for various control functions and may be connected to a plurality of eNBs.

The SGW 130 is an entity responsible for establishing and releasing data bearers under the control of the MME 120.

The Application Function (AF) 140 is an entity responsible for exchanging application information with the UE at the application level.

The Policy Charging and Rules Function (PCRF) 150 is an entity responsible for controlling Quality of Service (QoS) policy and providing the PGW 160 with Policy and Charging Control (PCC) rule. The PCRF 150 is an entity responsible for controlling the QoS and billing for the traffic. Meanwhile, the term "User Plane (UP)" denotes a path established by connecting UE 100, RAN node 110, SGW 130, and PGW 160 for user data transmission. On this path, the link between the UE 100 and the RAN node 110 is established through a radio channel most significantly restricted in terms of resource.

In the radio communication system such as LTE, QoS is applied per EPS bearer. One EPS bearer is used for IP flows requiring the same QoS. For An EPS bearer is configured with QoS-related parameters such as QoS Class Identifier (QCI) and Allocation and Retention Priority (ARP). The QCI is a parameter defining QoS priority with an integer value, and the ARP is a parameter for use in determining whether to accept or reject establishment of a new EPS bearer.

The EPS bearer corresponds to the Packet Data Protocol (PDP) context of the GPRS system. An EPS bearer belongs to a PDN connection which may have Access Point Name (APN) as a property. In the case of establishing a PDN connection for IMS service such as Voice over LTE (VoLTE), the PDN connection has to be established using a well-known IMS APN.

In order to support voice communication in the LTE network, it is possible to adopt the IMS-based VoLTE in Packet Switched (PS) mode or the CS Fall Back (CSFB) reusing the Circuit Switched (CS) mode of the 2G/3G system. VoLTE is a term used in LTE network in the same concept as Voice over IMS (VoIMS).

The communication system uses measurement information in order to control handover and transmission/reception power of the UE. The eNB sends the UE the information on the measurement targets and measurement parameters which may include per-measurement target offsets and threshold values for determining measurement report. The UE measures radio parameters of the measurement targets according to the configuration information and reports the measurement result to the eNB when the measurement condition is fulfilled.

DISCLOSURE OF INVENTION

Technical Problem

The present invention provides a method of maintaining a specific service, e.g. voice call service when starting the service is allowed in a network area but not in other network areas according to network configuration and load control method.

In an exemplary case of Voice over LTE (VoLTE) as a kind of voice service, it is possible to consider a network configured in such a way of allowing for a user to receive the VoLTE service in a Tracking Area (TA) but legacy Circuit Switch (CS) voice call service in other areas. The VoLTE is a voice service provided through a Packet Switched (PS) network and IMS network. In such a network architecture, when a UE moves from one area to another, the network domain of providing the voice service may change (between PS for VoLTE and CS for other voice service). In the case of VoLTE, when the UE moves from one network domain to another in the state that the voice call session is ongoing, the voice call is likely to be dropped. Even when the UE moves from one domain to the other without any ongoing voice call session, a mobile terminating call may be paged to the wrong domain so as to result in call loss. There is therefore a need of a method for maintaining the voice service even in the above situation.

In order to select a cell for transmitting/receiving user data and determining transmission/reception power, the UE has to acquire accurate state information. The UE performs measurement based on the measurement configuration information transmitted by the eNB and, in order to improve the measurement accuracy, repeats the measurement operation. Thus, if the measurement operation requires large amount of calculation or if there are large number of cells to measure for acquiring cell information, this will consume battery power quickly.

Meanwhile, selecting a serving cell and determining the transmit power level are closely related to the service quality and network load. If the measurement accuracy is low or measurement timing is determined incorrectly, this causes unnecessary measurement operation of the UE, resulting in unnecessary battery power consumption and increase of control load of the operator network.

Solution to Problem

A method according to an embodiment of the present invention includes receiving, at a base station, information on whether a neighbor base station support VoLTE in a mobile communication system, checking, when handover (HO) occurs, whether the neighbor base station supports the VoLTE, and starting, when the neighbor base station does not support VoLTE, Single Radio Voice Call Continuity (SRVCC).

A method according to an embodiment of the present invention includes receiving, at a core network node, a PS HO request message from a base station, checking whether the target base station supports VoLTE based on Tracking Area (TA), notifying, when the VoLTE is not allowed in the TA of the target base station, the base station that PS HO fails and SRVCC is required, and start the SRVCC if necessary.

A method according to an embodiment of the present invention includes checking, when registering location, whether a core network node supports VoLTE in an area where a terminal is located, sending, when the VoLTE is not supported, the terminal a response message with IMS VoPS set to 0, performing, at the terminal receiving the message, IMS deregistration process, and changing, at the terminal and network, a domain to CS for voice service. In accordance with an aspect of the present invention, a measurement control method of a terminal in a mobile communication system includes calculating measurement parameters into a value in advance and storing the value for reducing load of processing measurement parameters received from a base station and using, when necessary afterward, the value without additional calculation process.

In accordance with an aspect of the present invention, a measurement control method of a terminal in a mobile communication includes performing, when measurement is required for two or more frequencies or cells according to measurement parameters received from a base station, measurement of a first frequency or cell to reduce measurement load of the terminal, stopping, when a condition is fulfilled, measurement on the first frequency or cell temporarily, performing measurement on a second frequency or cell, and reporting, when a condition for the second frequency or cell is fulfilled, measurement result.

In accordance with an aspect of the present invention, a measurement control method of a terminal in a mobile communication system includes using, when measurement should be performed on two or more frequencies or cells according to measurement parameters received from a base station, one of the measurement parameters for the two or more frequencies or cells and ignoring the other parameters.

In accordance with an aspect of the present invention, a measurement control method of a terminal in a mobile communication system includes compensating measurement parameters received from a base station according to condition of the terminal for use in order to reduce unnecessary measurement and report processes and improve measurement accuracy.

In accordance with an aspect of the present invention, a method for a terminal to support IP Multimedia Subsystem (IMS) voice in a mobile communication system includes receiving a message associated with combined Tracking Area Update (TAU) from a network node, determining whether the network supports the IMS voice based on information included in the message, and waiting, when the network does not support the IMS voice and a bearer associated with a persistent Evolved Packet System (EPS) bearer context is activated, until the bearer is released.

In accordance with an aspect of the present invention, a terminal for supporting IP Multimedia Subsystem (IMS) voice in a mobile communication system includes a communication unit which receives a message associated with combined Tracking Area Update (TAU) from a network node and a control unit which determines whether the network supports the IMS voice based on information included in the message and controls waiting, when the network does not support the IMS voice and a bearer associated with persistent Evolved Packet System (EPS) bearer context is activated, until the bearer is released.

In accordance with an aspect of the present invention, a method for a Mobility Management Entity (MME) to support IP Multimedia Subsystem (IMS) voice in a mobile communication system includes receiving a combined Tracking Area Update (TAU) request message from a terminal and transmitting to the terminal a message including information for determining whether a network supports the IMS voice in response to the TAU request message, wherein, when the information is associated with not supporting the IMS voice and a bearer associated with a persistent Evolved Packet System (EPS) bearer context for the terminal is activated, the bearer is not locally released in and by the terminal.

In accordance with an aspect of the present invention, a Mobility Management Entity (MME) for supporting IP Multimedia Subsystem (IMS) voice in a mobile communication system includes a communication unit which receives a combined Tracking Area Update (TAU) request message from a terminal and a control unit which controls transmitting to the terminal a message including information for determining whether a network supports the IMS voice in response to the TAU request message, wherein, when the information is associated with not supporting the IMS voice and a bearer associated with a persistent Evolved Packet System (EPS) bearer context for the terminal is activated, the bearer is not locally released in and by the terminal.

In accordance with an aspect of the present invention, a method for a base station to support IP Multimedia Subsystem (IMS) voice in a mobile communication system includes detecting necessity of handover (HO) of a terminal and performing, when a handover target base station does not support the IMS voice, Packet Switched (PS) HO to Long Term Evolution (LTE).

In accordance with an aspect of the present invention, a base station for supporting IP Multimedia Subsystem (IMS) voice in a mobile communication system includes a communication unit which receives information and a control unit which detects necessity of handover (HO) of a terminal based on the received information and controls performing, when a handover target base station does not support the IMS voice, Packet Switched (PS) HO to Long Term Evolution (LTE).

Advantageous Effects of Invention

The service efficiency enhancement method and apparatus of the present invention is advantageous in terms of providing the user with a voice service seamlessly without call loss even when the UE roams between a VoLTE area and a non-VoLTE area.

Also, the service efficiency enhancement method and apparatus of the present invention is advantageous in terms of reducing control load and battery power consumption required in performing measurement for handover and transmit power determination.

MODE FOR THE INVENTION

Figure 1:
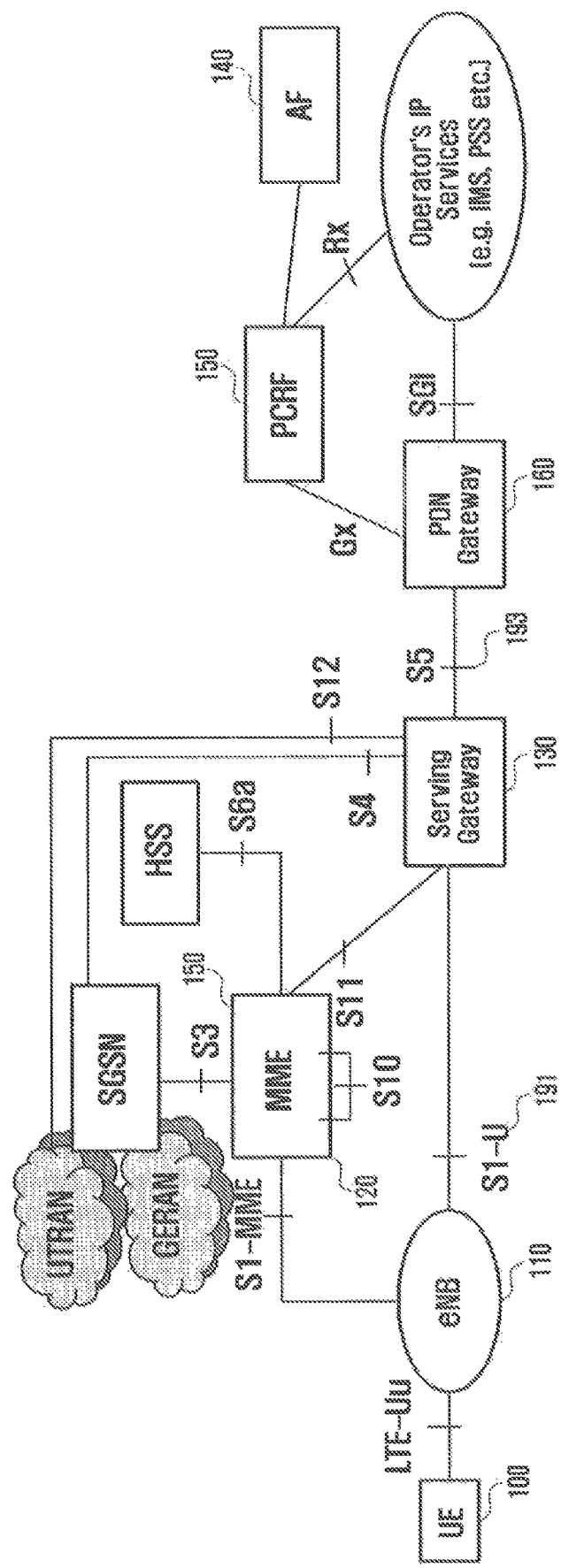
FIG. 1 is a diagram illustrating the general LTE mobile communication system architecture.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Although the description is directed to the OFDM-based radio communication system, particularly the 3GPP EUTRA, it will be understood by those skilled in the art that the present invention can be applied even to other communication systems having the similar technical background and channel format, with a slight modification, without departing from the spirit and scope of the present invention. Also, although the description is directed to VoLTE, the present invention can be applied to other voice services such as IMS-based voice service with a slight modification.

First, a description is made of the problematic situation of the mobile communication network in which an LTE system and a legacy system coexist.

A mobile network operator may configure the mobile communication system with the VoLTE and non-VoLTE networks. The VoLTE supportability may depend on the network area, e.g. cell and eNB as relatively small units and Tracking Area (TA) and pool area of MME as relatively large units. A core network node, particularly MME, notifies the UE which has initiated an Attach or Tracking Area Update (TAU) procedure in the VoLTE network area of availability of the IMS-based voice service by sending an IMS voice service availability indicator but notifies the UE which has initiated the Attach or TAU procedure in the non-VoLTE network area of unavailability of the IMS-based voice service by not sending the IMS voice service availability indicator.

In an embodiment of the present invention, if the reason of not supporting the VoLTE in a certain area is because of no interoperability between the core network and the IMS network or lack of VoLTE capabilities of Random Access Network (RAN) nodes and/or core network nodes, the UE cannot receive the VoLTE service when it enters the non-VoLTE network area. This means that when a new voice call (including both the mobile originating and terminating calls) occurs the voice call is handled through the CS network other than VoLTE network and also means that the VoLTE call made in the VoLTE network area is changed to the CS voice call or dropped when the UE moves to a non-VoLTE network area.

Whereas, the reason of not supporting the VoLTE in a certain area may be call setup or load control problem caused by the lack of IMS network capacity. For example, if the IMS network capacity is not enough to serve all of the LTE users, the system may restrict the use of VoLTE in some areas, while allowing the VoLTE service to be provided in other areas (TAs), to protect against overload of the IMS network.

At this time, the core network of the non-VoLTE network may be connected to the IMS, and both the RAN and core network nodes may support all VoLTE-related functions. In such a network configuration, if the UE with ongoing voice call session established in the VoLTE network area moves to the non-VoLTE network area, the continuity of the voice call may be handed over to a CS network using the SRVCC or maintained still through the PS and IMS network in the non-VoLTE network area. In the latter case, only the PS and IMS networks of the ongoing voice call are allowed for maintaining the service continuity even in the non-VoLTE network area.

After determining to continue serving the ongoing VoLTE call handed over from the non-VoLTE network area over the PS and IMS networks according to the network configuration, if the voice call ends, the system may control to serve the subsequent voice calls over the CS network other than the PS and IMS networks because the voice call over the PS and IMS networks has been allowed only for the service continuity in the area which is supposed not to support the VoLTE. This can be achieved in such a way of releasing the IMS registration of the UE, performing a combined Attach/TAU to use CSFB, or turning off the E-UTRAN function to use the 2G/3G legacy network, when the voice call initiated in the PS and IMS networks ends.

A description is made of the method for solving the aforementioned problem hereinafter.

The first approach is to use, when Handover (HO) is required, the VoLTE capability configuration informations of neighbor eNBs (hereinafter, used in the concept of including cells) which are retained in the source eNB to perform, if the candidate target eNB belongs to the VoLTE-supporting area, a PS HO and, otherwise, perform SRVCC to a 2G/3G network to support voice call service continuity. If the eNB supports VoLTE, this means that the eNB belongs to an area supporting the IMS VoPS or supports only the continuity of the VoLTE call of the UE handed over from another eNB or cell (i.e., placing a new mobile originating VoLTE call and receiving a new mobile terminating VoLTE call are restricted).

Figure 2:
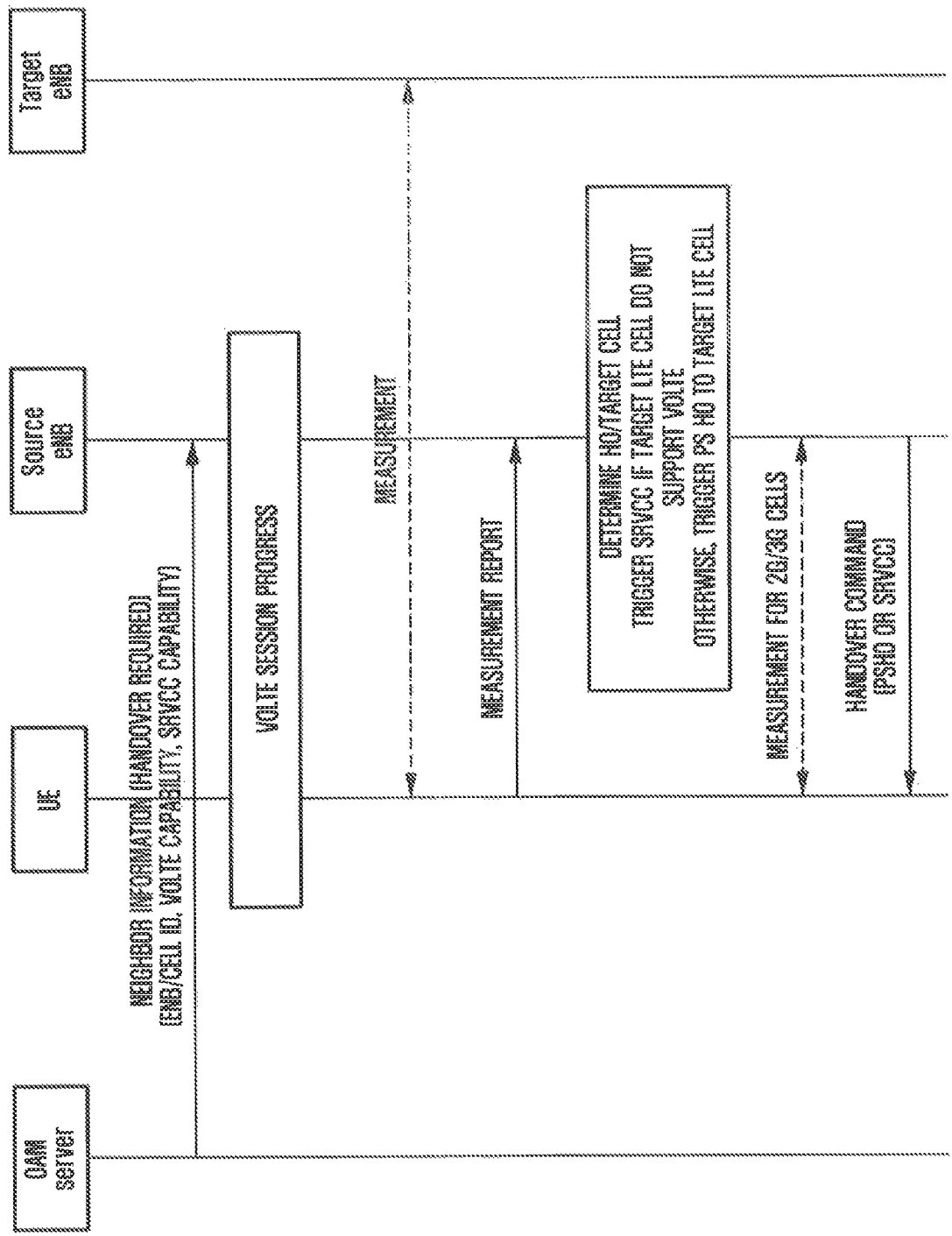
FIG. 2 is a signal flow diagram illustrating a method of selecting a voice service continuity support scheme between PS HO and SRVCC based on the eNB configuration.

FIG. 2 is a signal flow diagram illustrating a method of selecting a voice service continuity support scheme between PS HO and SRVCC based on the eNB configuration.

Referring to FIG. 2, the source eNB has the information on the neighbor eNBs. This information may be provided by an Operation and Maintenance (O&M) server or acquired by means of the UEs. It is also possible to configure the information manually. The above information may be transferred to the eNB through a Handover Restriction List for UE. The O&M server also provides the eNB with the information such as eNB/cell ID, VoLTE supportability, and SRVCC supportability. Likewise, the eNB may command the UE to collect and report information on the neighbor eNBs and, in response to the command, the UE may report the information on the eNB/cell ID, VoLTE supportability, and SRVCC supportability. The UE having an ongoing VoLTE call performs measurement and sends the eNB the measurement report. At this time, if it is determined that the UE has the ongoing VoLTE call (i.e. a QCI set to 1 or 5 in the activated state) and LTE eNBs that are not supporting VoLTE around, it may be necessary to configure measurement for the 2G/3G cells to the UE. If it is necessary to receive the measurement report to support UE mobility (HO), the eNB checks whether the candidate target LTE eNBs supports the VoLTE based on the configuration information. If there is any eNB supporting the VoLTE among the candidate target LTE eNBs, the eNB triggers a PS HO procedure to hand over the VoLTE call. If there is no eNB supporting the VoLTE among the candidate target LTE eNBs, the eNB performs the SRVCC procedure to hand over the voice call to the 2G/3G cell. At this time, the eNB may configure measurement to the UE to search for a suitable 2G/3G cell and receive a response. If the measurement has been performed in the previous process, it can be omitted. If the eNB supports the VoLTE, this may be the case where the eNB supports continuity of the VoLTE call handed over from another eNB or cell as well as the case where the eNB belongs to the area supporting IMS VoPS (i.e. the UE is restricted in placing a new mobile originating VoLTE call or receiving a new mobile terminating VoLTE call).

In a certain network structure, it may be difficult to configure the information on the neighbor eNBs to an eNB node. In an exemplary case where an operator rents part of its network from another operator by making a lease agreement, it is possible to use the function of the network but not allowed to modify the network configuration information. In this situation, it is difficult for the eNB to acquire the information on the VoLTE supportability of the neighbor eNBs and thus there is a need of solving such problems in the core network.

If the UE having an ongoing VoLTE call moves so as to bring about the necessity of HO and the eNB triggers PS HO because no VoLTE capability information of the neighbor eNBs is configured, the MME checks that the UE has the ongoing VoLTE call, based on whether there is any bearer with QCI 1 or 5 or whether IMS APN is used, and determines whether the target eNB supports the VoLTE. Here, the bearer with CQI 1 may be called Persistent EPS bearer context-related bearer. The VoLTE call denotes a call with the QoS of teleservice 11. If the target eNB does not support VoLTE, the MME sends the source eNB a HO reject message including an indicator indicating that the target eNB does not support VoLTE or and identifier indicating that SRVCC is required and, upon receipt of this message, the source eNB performs SRVCC procedure. If the eNB supports VoLTE, this may be the case of supporting only the continuity of the VoLTE call handed over from another eNB or cell (i.e. placing a new mobile originating VoLTE call and receiving a new mobile terminating VoLTE call are restricted).

Figure 3:
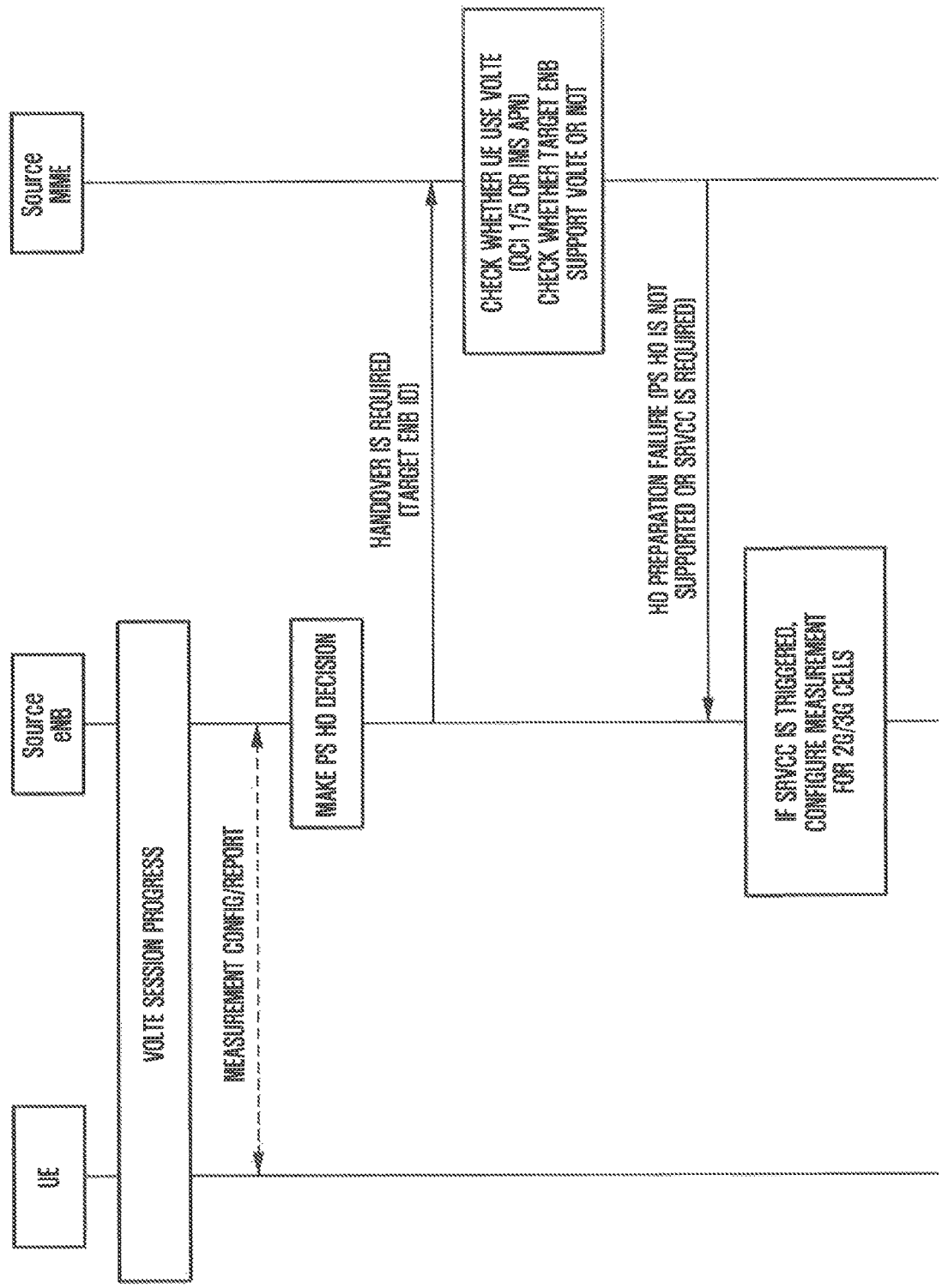
FIG. 3 is a signal flow diagram illustrating a method for an MME to select the voice service continuity support scheme between the PS HO and SRVCC based on the TA of the target eNB.

FIG. 3 is a signal flow diagram illustrating a method for an MME to select the voice service continuity support scheme between the PS HO and SRVCC based on the TA of the target eNB.

Referring to FIG. 3, if a measurement report is received from the UE having an ongoing VoLTE call, the eNB determines necessity of HO and sends the MME a Handover Required message including the ID of the target eNB. Upon receipt of the message, the MME determines whether the UE has the ongoing VoLTE call. If a bearer with QCI 1 or 5 is activated and/or if a PDN connection for the IMS APN is in use, the MME determines that the VoLTE is in use. If the UE has the ongoing VoLTE call, the MME determines whether the target eNB (or area) supports the VoLTE based on the ID of the target eNB or the area to which the eNB/cell belongs (e.g. TAI). This may be performed based on a table indicating VoLTE capability per eNB/cell ID or TAI and configured manually, based on VoLTE capability informed in the procedure of establishing a connection between the eNB and the MME or the procedure of a separate inquiry/reply procedure. The above information may be transmitted to the MME by means of a Handover Restriction List per the UE. If the target eNB supports VoLTE, the MME continues the PS HO process and, otherwise, notifies the source eNB of PS HO incapability. At this time, it is possible to use a S1 Handover Preparation Failure message including the HO failure reason indicating that PS HO is not supported for the VoLTE call or the information indicating that SRVCC is required. Upon receipt of this message, the source eNB is aware of the necessity of SRVCC instead of PS HO and triggers the SRVCC procedure. If it is known that there is a neighbor cell having an area supporting VoLTE or a neighbor eNB supporting VoLTE after triggering the PS HO and transmitting a HO Request message to the MME, the MME notifies the source eNB that the SRVCC request cannot be accepted. In this case, it is possible to use the S Handover Preparation Failure message including the information on the HO failure reason indicating necessity of PS HO for the VoLTE call. Upon receipt of this message, the source eNB may trigger the PS HO of the UE to the neighbor LTE cell instead of performing SRVCC. If the eNB supports VoLTE, this may be the case where the eNB supports continuity of the VoLTE call handed over from another eNB or cell as well as the case where the eNB belongs to the area supporting IMS VoPS (i.e. the UE is restricted in placing a new mobile originating VoLTE call or receiving a new mobile terminating VoLTE call).

Meanwhile, if the UE having an ongoing IMS VoPS call moves to an area in which the IMS VoPS is not supported and the UE is aware of this, it may not perform any operation which may affect the call continuity to maintain the ongoing IMS VoPS call. In detail, the UE may maintain the connected state (ECM-CONNECTED) to maintain the ongoing IMS VoPS and stop generating any ESM signaling associated with the IMS VoPS call (e.g., request for IMS VoPS-related PDN connection and activation, deactivation, or modification of EPS bearer).

The previous embodiments are directed to the method of supporting service continuity, when handover is triggered, by performing the SRVCC instead of PS HO if there is no neighbor eNB supporting VoLTE. Also, the embodiments are directed to a method of supporting the service continuity, when handover is required, by performing PS HO in the case of allowing supporting VoLTE call in spite of the configuration prohibiting IMS VoPS. Other embodiments of the present invention are directed to a method for the case where although the neighbor eNBs belong to the area supporting VoLTE they actually cannot support a PS voice session.

In the case that the UE having an ongoing VoLTE call moves so as to bring about the necessity of HO, the source eNB performs a PS HO procedure. In the case that the VoLTE capability is determined per TA (or set of TAs), if the UE is handed over to the eNB configured so as not to support VoLTE, the Tracking Area Update (TAU) procedure is performed. At this time, the MME may check that the UE has moved to the eNB/area configured so as not to support VoLTE and then notifies the UE that the IMS VoPS (interchangeably used with IMS Voice over PS and VoLTE/VoIMS in the same meaning) is not supported. In this procedure, the voice service domain for the UE is changed from PS to CS, and the mobile originating and terminating calls are served through the CS network. This operation (i.e. maintaining the ongoing VoLTE call and changing the domain to CS after the end of the call) may be performed after waiting for the end of the voice call to prevent the ongoing voice call from being dropped. For this purpose, if the UE having an ongoing IMS VoPS call moves to an area in which the IMS VoPS is not supported and recognizes this situation, it may stop performing any operation which may affect the call continuity to maintain the ongoing IMS VoPS call. In detail, the UE may maintain the connected state (ECM-CONNECTED) to maintain the ongoing IMS VoPS and stop generating any ESM signaling associated with the IMS VoPS call (e.g., request for IMS VoPS-related PDN connection and activation, deactivation, or modification of EPS bearer). The UE also may apply the above operation to only a specific PLMN. For example, the UE may apply the above operation to only the HPLMN or a PLMN selected based on predetermined per-PLMN operation information.

Figure 4:
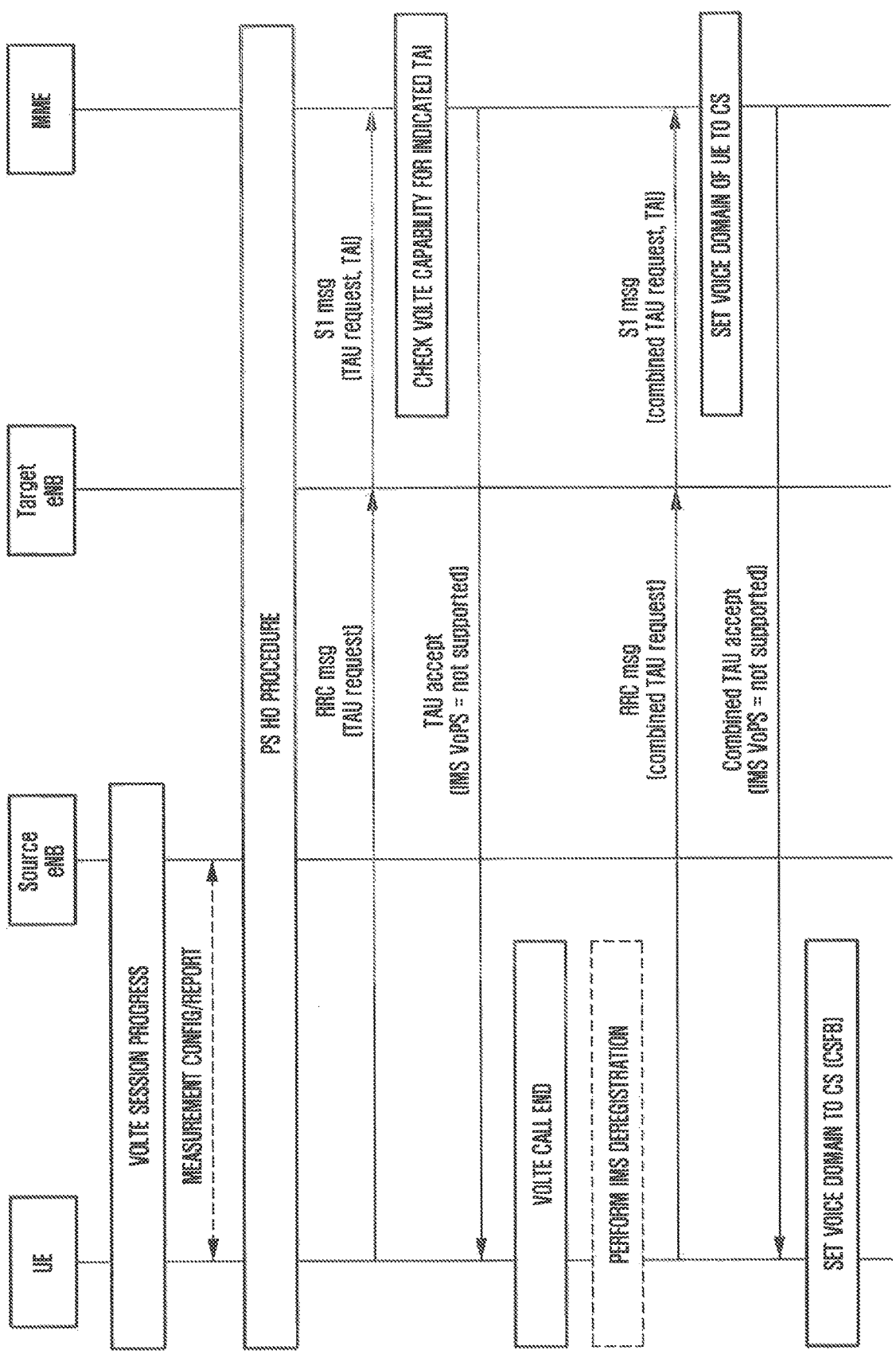
FIG. 4 is a signal flow diagram illustrating a voice service domain change procedure of a UE which has been aware that IMS VoPS is not supported according to an embodiment of the present invention.

FIG. 4 is a signal flow diagram illustrating a voice service domain change procedure of a UE which has been aware that IMS VoPS is not supported according to an embodiment of the present invention.

Referring to FIG. 4, if the UE having an ongoing IMS VoPS moves so as to bring about the necessity of HO, the source eNB performs a PS HO procedure. If the cell which the UE has entered belongs to the eNB configured so as not to support VoLTE, the ongoing voice call is handed over through the PS HO procedure but a new voice call may not be processed through the IMS VoPS. As described in the embodiments of the present invention, the area for allowing/prohibiting VoLTE is configured per TA (or set of TAs) and, in the case of this embodiment, i.e. if the UE having an ongoing VoLTE call is handed over to the eNB configured so as not to support VoLTE, the TAU procedure has to be performed. If the UE sends the eNB a Radio Resource Control (RRC) message including a normal TAU request, the eNB sends the MME an S1 message containing the RRC message and the ID of the TA to which the serving cell of the UE belongs, i.e. TAI. In the previous PS HO procedure, the MME may receive the TAI of the TA to which the eNB belongs from the source eNB and store the TAI. The MME may check the TA to which the UE belongs based on this information and determine whether the eNBs of the corresponding TA are configured to support VoLTE. If the VoLTE is not supported, the MME sets the IMS VoPS field of the EPS network feature support information of the TAU accept message which is transmitted to the UE to 0 (i.e. 'not supported'). Upon receipt of this message, the UE becomes aware that the VoLTE is not supported in the current area. Although the message set to a value indicating that the IMS VoPS is not supported, the UE does not change the voice service domain to CS immediately if there is any ongoing IMS VoPS call. If the UE having an ongoing IMS VoPS call moves to an area in which IMS VoPS is not supported and recognizes this situation, it does not perform any operation which may affect the call continuity to maintain the ongoing IMS VoPS call. In detail, the UE may stay in the connected state (ECM-CONNECTED) to maintain the ongoing IMS VoPS call and refrain from generating ESM signaling associated with the IMS VoPS call (e.g. request for IMS VoPS-related PDN connection and activation, deactivation, or modification of EPS bearer). Then the UE may wait until the ongoing voice call ends and, if the voice call ends, perform IMS deregistration to notify the network of not using the IMS any more explicitly. The IMS deregistration can be accomplished by transmitting a registration message with the lifetime set to 0. Since the UE has to use the CS domain for the voice service, it sends the MME a combined TAU request message for CSFB registration. If the network supports CSFB, the MME sends the UE a TAU accept message with the type field set to 'combined' to notify the available of CSFB since then, changes the voice domain for the UE to CS, and performs a UE location registration procedure for the CS service with a Mobile Switching Center (MSC). If a TAU Accept message with an EPS update result Information Element (IE) set to combined Tracking Area/Location Area (TA/LA) updated is received, the UE becomes aware that the CSFB is available for the voice service since then. If although the UE has sent the MME the combined TAU request for use of CSFB the network does not support CSFB, the MME sends the UE the TAU accept message with the EPS update result IE set to 'TA updated' and thus the UE becomes aware of the unavailability of the CSFB upon receipt of this message. In this case, the UE may disable the E-UTRAN function and then operate to use the 2G/3G network.

In the above embodiment, the UE operation of receiving the EPS update result IE in the TAU Accept message, disabling the E-UTRAN function, and using the 2G/3G network may be controlled according to a number of TAU requests. That is, the UE increases the number of TAU requests by 1, whenever the TAU request is transmitted, and disables the E-UTRAN function and selects the GERAN/UTRAN network to perform the network-specific operation (GMM or MM operation) only when the number of TAU requests is equal to or greater than a predetermined value (e.g. 5).

If an ongoing IMS VoPS session exists and it is determined that TAU is necessary, the UE may transmit the normal TAU request instead of the combined TAU request. This is to protect against occurrence of a new CS mobile terminating call request due to the CS domain location update of the UE. In more detail, if a CS mobile terminating call occurs in the state where the voice domain for the UE having an ongoing IMS VoPS session is changed to CS due to the combined TAU, this may generate a paging for the CS call (or CS service notification) in spite of the existence of the ongoing voice call (IMS VoPS) and thus, in order to protect against this, it is possible to perform the normal type TAU and then the combined TAU again after the end of the IMS VoPS if it is necessary to maintain the IMS VoPS call even when the combined TAU has to be performed according to the configuration.

Meanwhile, if an emergency call occurs in the state that the UE receives a reply in response to the first TAU request (before accepting the use of the CS domain through the second TAU procedure) after the PS HO in the above situation, the UE disables the E-UTRAN function immediately and moves to the 2G/3G network to perform the emergency call procedure because the UE has to start the emergency call before the awareness of the availability of the CSFB.

According to an embodiment of the present invention, even when configured to use IMS VoPS, the UE may perform the combined type Attach/TAU instead of the normal type Attach/TAU. This is for the case where SMS is provided through the CS network while the voice service is provided through the IMS VoPS. In this case, although it can always use CSFB, the UE uses the VoLTE since the VoLTE is supported too. In this case, it is possible to reduce number of times of the TAU procedure which is performed twice in the previous embodiment.

Figure 5:
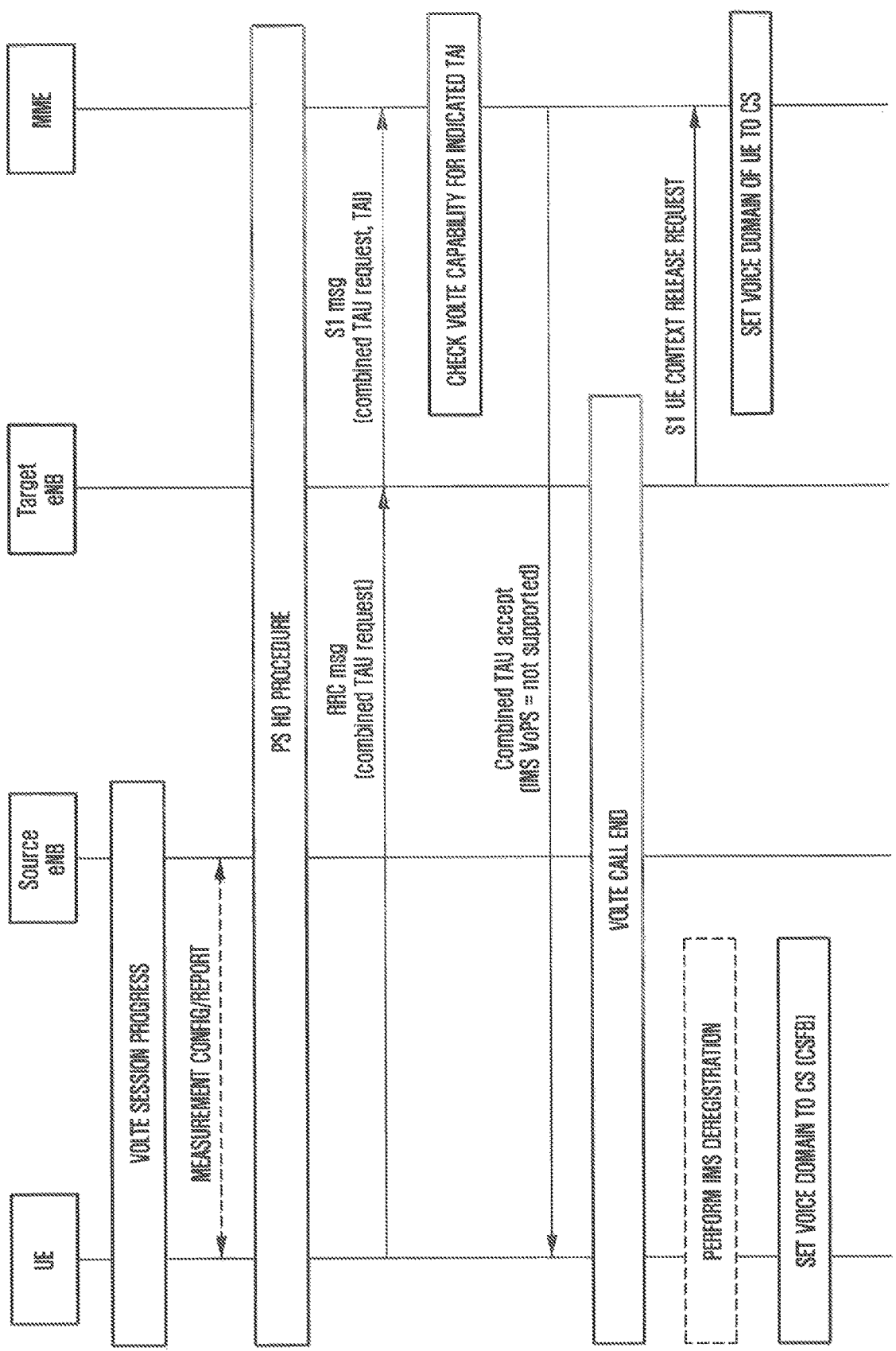
FIG. 5 is a signal flow diagram illustrating a voice service domain change procedure of a UE which has been aware that IMS VoPS is not supported according to another embodiment of the present invention.

FIG. 5 is a signal flow diagram illustrating a voice service domain change procedure of a UE which has been aware that IMS VoPS is not supported according to another embodiment of the present invention.

Referring to FIG. 5, if the UE having an ongoing IMS VoPS moves so as to bring about the necessity of HO, the source eNB performs a PS HO procedure. If the cell which the UE has entered belongs to the eNB configured so as not to support VoLTE, the ongoing voice call is handed over through the PS HO procedure, but a new voice call may not be processed through the IMS VoPS. As described in the embodiments of the present invention, the area for allowing/prohibiting VoLTE is configured per TA (or set of TAs) and, in the case of this embodiment, i.e. if the UE having an ongoing VoLTE call is handed over to the eNB configured so as not to support VoLTE, the TAU procedure has to be performed. If the UE sends the eNB an RRC message including a normal TAU request, the eNB sends the MME an S1 message containing the RRC message and the ID of the TA to which the serving cell of the UE belongs, i.e. TAI. In the previous PS HO procedure, the MME may receive the TAI of the TA to which the eNB belongs from the source eNB and store the TAI. The MME may check the TA to which the UE belongs based on this information and determine whether the eNBs of the corresponding TA are configured to support VoLTE. If the VoLTE is not supported, the MME sets the IMS VoPS field of the EPS network feature support information of the TAU accept message which is transmitted to the UE to 0 (i.e. 'not supported'). Since the UE has requested for the combined type location update, the MIME transmits the Combined TAU accept message with the EPS update result IE set to 'combined TA/LA updated' when the CSFB is supported. Upon receipt of this message, the UE becomes aware that the VoLTE is not supported in the current area. Although the message set to a value indicating that the IMS VoPS is not supported, the UE does not change the voice service domain to CS immediately if there is any ongoing IMS VoLTE call. If the UE having an ongoing IMS VoPS call moves to an area in which IMS VoPS is not supported and recognizes this situation, it does not perform any operation which may affect the call continuity to maintain the ongoing IMS VoPS call. In detail, the UE may stay in the connected state (ECM-CONNECTED) to maintain the ongoing IMS VoPS call and refrain from generating ESM signaling associated with the IMS VoPS call (e.g. request for IMS VoPS-related PDN connection and activation, deactivation, or modification of EPS bearer). Then the UE may wait until the ongoing voice call ends and, if the voice call ends, perform IMS deregistration to notify the network of not using the IMS any more explicitly. The UE may recognize that the CSFB is available for the voice service since then through the previous TAU procedure. The MIME may recognize the end of the ongoing VoLTE call by itself (the bearer with QCI=1 is released and/or deactivated) or receive an S1 UE context release request transmitted by the eNB due to the end of the voice call and no data for the UE, it recognizes the end of the VoLTE call and changes the voice call domain to the CS for the voice call occurring since then. If although the UE has sent the MME the combined TAU request for use of CSFB the network does not support CSFB, the MIME sends the UE the TAU accept message with the EPS update result IE set to 'TA updated' and thus the UE becomes aware of the unavailability of the CSFB upon receipt of this message. In this case, the UE may disable the E-UTRAN function and then operate to use the 2G/3G network.

In the above embodiment, the UE operation of receiving the EPS update result IE in the TAU Accept message, disabling the E-UTRAN function, and using the 2G/3G network may be controlled according to a number of TAU requests. That is, the UE increases the number of TAU requests by 1, whenever the TAU request is transmitted, and disables the E-UTRAN function and selects the GERAN/UTRAN network to perform the network-specific operation (GMM or MM operation) only when the number of TAU requests is equal to or greater than a predetermined value (e.g. 5).

Meanwhile, an emergency call may occur in the state that the UE receives a reply in response to the first TAU request after the PS HO in the above situation. If CSFB is allowed, it is possible to locally deactivate the bearers for the VoLTE call selectively and transmit an Extended Service Request for processing the emergency call immediately. If CSFB is not allowed, it is possible to disable the E-UTRAN function immediately and move to the 2G/3G network to perform the emergency call procedure.

Figure 6:
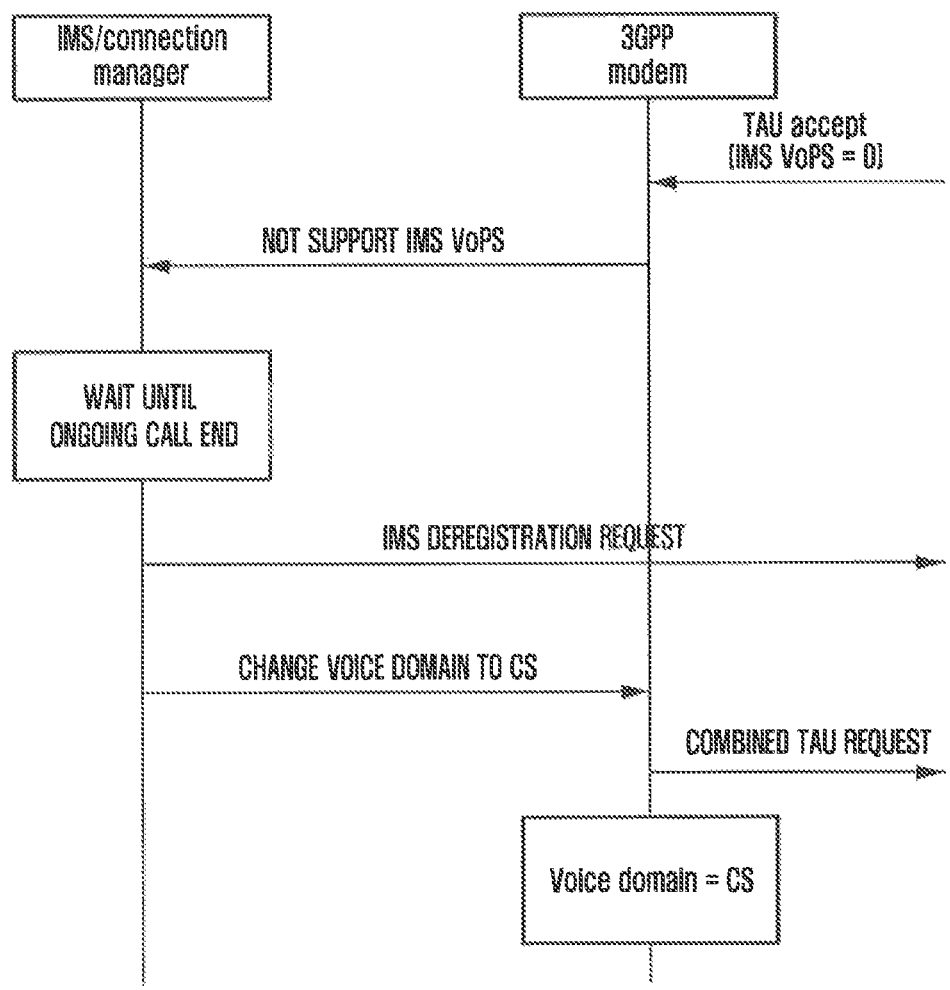
FIG. 6 is a signal flow diagram illustrating an internal operation of a UE which has been aware that IMS VoPS is not supported according to an embodiment of the present invention.

FIG. 6 is a signal flow diagram illustrating an internal operation of a UE which has been aware that IMS VoPS is not supported according to an embodiment of the present invention.

FIG. 6 shows the interoperation between a 3GPP modem layer responsible for the functions associated with the 3GPP access network and the IMS/connection manager layer responsible for IMS and overall communication functions in the UE.

Referring to FIG. 6, the 3GPP modem layer and the IMS/connection manager layer may be connected directly or through a Radio Interface Layer (RIL) interposed therebetween. If the 3GPP modem receives the TAU accept message with IMS VoPS=0 (VoLTE is not supported), it notifies the IMS/connection manager that the IMS VoPS is not supported any more through the RIL layer or an Application Programmable Interface (API). Upon receipt of this, the IMS/connection manager sends an SIP message requesting for IMS deregistration and notifies the 3GPP modem that the voice domain should be changed to CS. The 3GPP modem layer changes the voice domain to CS and, if necessary (if the previous TAU procedure is not the combined type), performs the combined TAU procedure.

Although the interoperation between the IMS/connection management layer and the 3GPP modem layer is described in association with the requests/commands and operations related thereto with reference to FIG. 6, this is just one embodiment, and the procedure of receiving, at the 3GPP modem, the TAU accept message indicating that the IMS VoPS is not supported, performing IMS deregistration procedure based on the message, and changing the voice service domain to the CS (or CSFB) as the subject matter of the present invention is applicable to other cases with slight modification.

Figure 7:
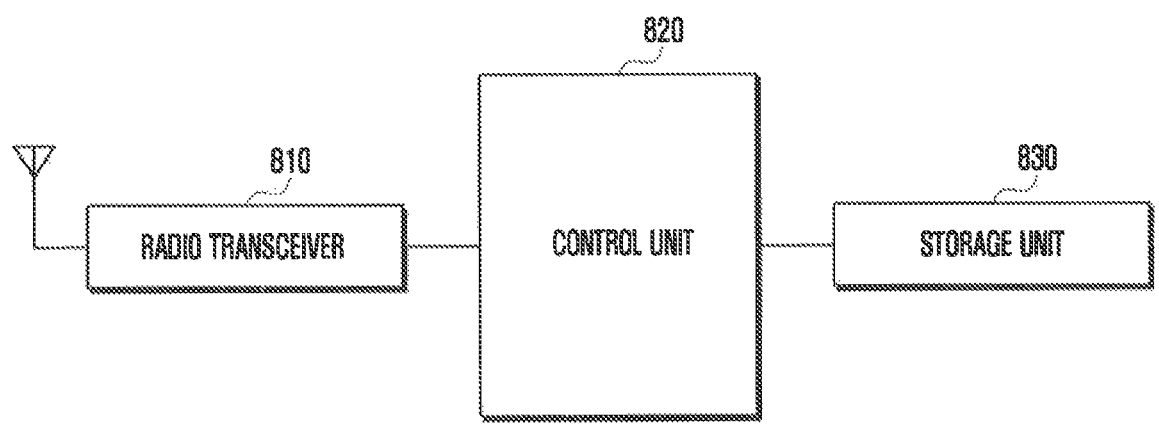
FIG. 7 is a block diagram illustrating a configuration of a UE according to an embodiment of the present invention.

FIG. 7 is a block diagram illustrating a configuration of a UE according to an embodiment of the present invention.

Referring to FIG. 7, the UE according to an embodiment of the present invention includes a radio transceiver, a control unit, and a storage unit.

The radio transceiver receives information on whether IMS VoPS is supported from the network and transmits/receives registration-related messages under the control of the control unit. The control unit determines whether to perform the IMS deregistration procedure and changes the voice service domain according to the above-described embodiment. The storage unit may store various informations necessary for the operation of the UE according to the embodiments of the present invention. For example, the storage unit may store the IMS VoPS capability per TA.

Associating FIG. 7 with FIG. 6, the radio transceiver of FIG. 7 may correspond to the 3GPP modem layer of FIG. 6, and the control unit of FIG. 7 may correspond to the IMS/connection management layer of FIG. 6.

Figure 8:
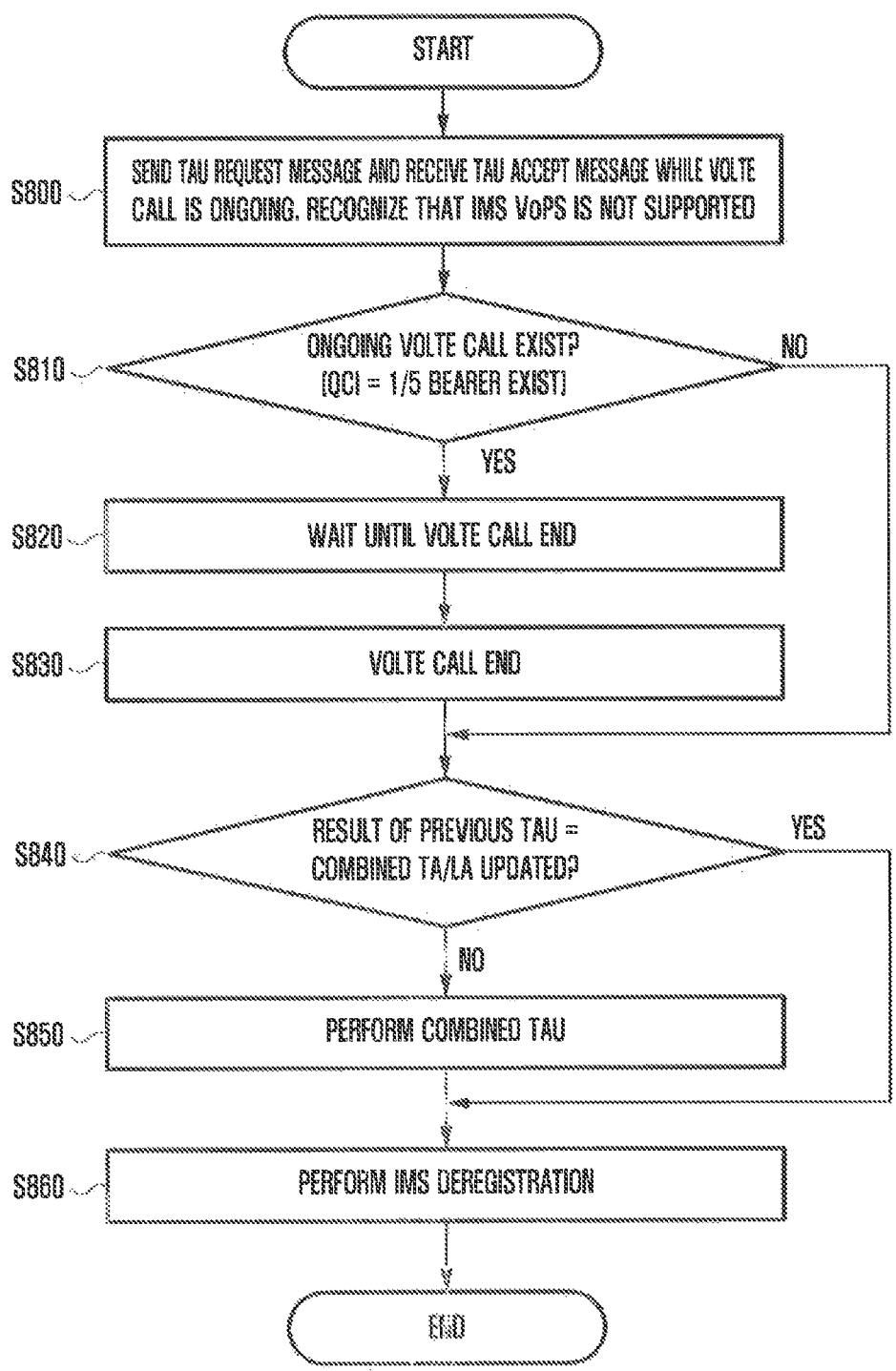
FIG. 8 is a flowchart illustrating the operation flow of a UE according to an embodiment of the present invention.

FIG. 8 is a flowchart illustrating the operation flow of a UE according to an embodiment of the present invention.

Referring to FIG. 8, if a TAU trigger condition is fulfilled, the UE having an ongoing VoLTE call sends the MME a TAU Request message at step S800. If this message is received, the MME may determine whether the VoLTE (IMS VoPS) is supported in the area where the user is located. If the VoLTE is not supported in the corresponding area, the MME sets the IMS VoPS field of the EPS network feature support information of the TAU accept message to be transmitted to the UE to 0 (i.e. 'not supported') or generates the TAU accept message without the information to notify that the VoLTE is not supported.

If the VoLTE capability is changed from 'supported' to 'not supported' upon receipt of the message, the UE determines whether any ongoing VoLTE call exists at step S810. Whether any ongoing VoLTE call exists may be determined based on the information provided explicitly by another layer or whether a bearer with CQI 1/5 is activated.

If any ongoing VoLTE call exists, the UE waits until the VoLTE call ends at step S820 and, if the VoLTE call ends at step S830, determines whether the updated state of TAU result received previously is the combined TA/LA updated at step S840. When the UE has the ongoing IMS VoPS call and moves to the area where the IMS VoPS is not supported, it recognizes this situation and refrains from doing any operation which may affect the call continuity to maintain the ongoing IMS VoPS call. In detail, the UE stays in the connected state (ECM-CONNECTED) to maintain the ongoing IMS VoPS call and refrains from generating ESM signaling related to the IMS VoPS call (e.g., request for IMS VoPS-related PDN connection and activation, deactivation, or modification of EPS bearer).

If so, the UE performs IMS deregistration and changes the voice domain to CS at step S860. If the voice domain is changed to CS, this means that when a mobile originating voice call occurs since then the voice call is set up through the CS network (using CSFB). Otherwise if the updated state as a result of the TAU received previously with the end of the VoLTE call is not the combined TA/LA updated, the UE performs the combined TAU procedure again at step S850 and then, if the combined TA/LA updated is accepted through the accept message, it performs IMS deregistration and changes the voice domain to CS. In order to trigger the second TAU (i.e. combined TAU), the UE may request the NAS layer to transmit the TAU message directly or let one of the TAU trigger conditions be fulfilled deliberately. For example, the UE may change one of the usage setting, voice domain preference, and Discontinuous Reception (DRX) cycle to trigger TAU. The parameter is changed temporarily to trigger TAU and recovered to the original value for the next TAU procedure.

In the previous embodiment, the UE may check the PLMN which provides the user with the current service. That is, the procedure in which, if a message indicating that the IMS VoPS is not supported in the state of having an ongoing VoLTE call, the UE waits until the voice call ends and performs the combined TAU, if necessary, and IMS deregistration and changes the voice domain to CS is applicable only to a predetermined PLMN. For this purpose, the UE compares the operation of the currently selected PLMN and predetermined per-PLMN operations to execute the allowed operation.

Figure 9:
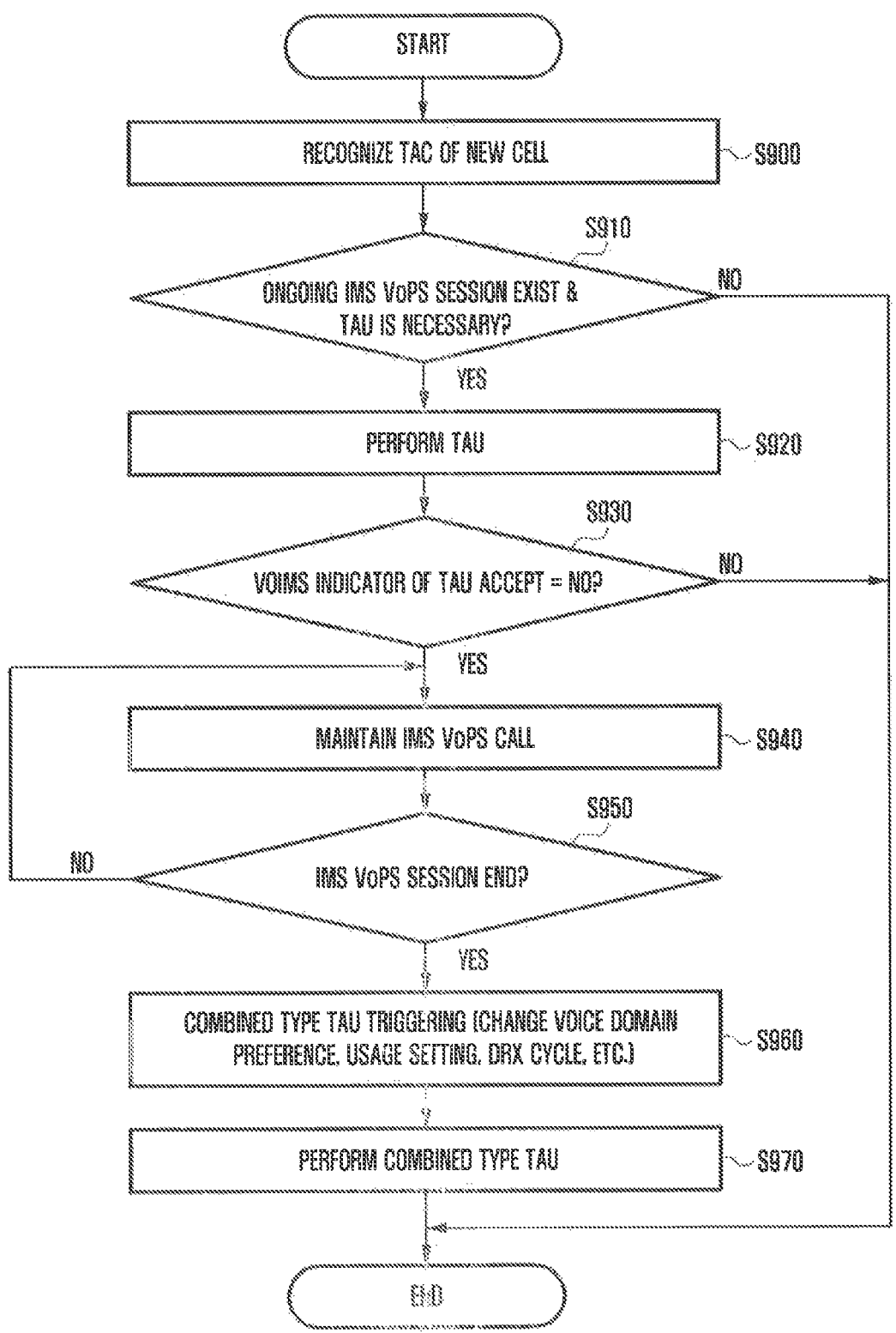
FIG. 9 is a flowchart illustrating a TAU procedure according to an embodiment of the present invention.

FIG. 9 is a flowchart illustrating a TAU procedure according to an embodiment of the present invention.

Referring to FIG. 9, the UE recognizes a TAC of a new cell at step S900. Before step S900, the UE may have an ongoing IMS VoPS call.

In the case that the TAC of the new cell is recognized, the UE determines whether an ongoing IMS VoPS session exists and TAU is required at step S910.

If an ongoing IMS VoPS session exists and TAU is required, the UE performs TAU at step S920.

The UE determines whether the TAU accept message received from the MME indicates that the VoIMS is not supported in the current area at step S930. If the TAU accept message indicates that the VoIMS is not supported in the current area, the UE maintains the ongoing IMS VoPS session at step S940 and waits until the IMS VoPS session ends at step S950. If the UE has an ongoing IMS VoPS call and moves to an area where the IMS VoPS is not supported, the UE recognizes this situation and refrains from taking any operation which may affect the call continuity to maintain the ongoing IMS VoPS call. In detail, the UE stays in the connected state (ECM-CONNECTED) to maintain the ongoing IMS VoPS and refrain from generating ESM signaling associated with the IMS VoPS call (e.g. request for IMS VoPS-related PDN connection and activation, deactivation, or modification of EPS bearer). For example, the UE may change one of the usage setting, voice domain preference, and DRX cycle to trigger TAU.

In the case that the IMS VoPS session is maintained, the UE may check the necessity of TAU (pending TAU) and perform combined TAU. As described above, the TAU is triggered when the TAU is requested to the NAS layer through an API or when at least one of the TAU trigger conditions is fulfilled. For example, the UE may change one of the usage setting, voice domain preference, and Discontinuous Reception (DRX) cycle to trigger TAU. The parameter is changed temporarily to trigger TAU and recovered to the original value for the next TAU procedure. The UE may also perform an IMS deregistration procedure additionally to nullify the IMS registration.

If the IMS session ends, the UE triggers the combined TA/LA update at step S960. The combined TA/LA update is triggered when the TAU is requested to the NAS layer through an API or when at least one of the combined TA/LA update trigger conditions is fulfilled. For example, the UE may change one of the usage setting, voice domain preference, and DRX cycle to trigger TAU.

Then the UE performs the combined type TAU at step S970. The parameter is changed temporarily to trigger TAU and recovered to the original value for the next TAU procedure. The UE may also perform an IMS deregistration procedure additionally to nullify the IMS registration.

In the above described embodiments, the steps are selectively performed or omitted. In each embodiment, the steps are not necessary to be performed in the sequential order as depicted but may be performed in a changed order. Also, the TAU step and Attach or Routing Area Update (RAU) step may be performed in an inverse order. In the present invention, the terms 'combined Tau', 'combined type TAU', and 'combined TA/LA update' are used in the same meaning.

Throughout the specification and drawings, the terms 'LTE network' and 'E-UTRAN' may be used in the same meaning, the CS network may be one of the UTRAN, GERAN, CDMA2000, and their equivalents that are capable of supporting the CS service and referred to as legacy networks. Throughout the specification and drawings, existing in a network includes camping on the network in either the connected state or idle state. The term 'base station' corresponds to the eNB of E-UTRAN. In the present invention, the measurement targets of the UE are cells and, although one cell operates on a specific frequency, a plurality of cell may exist on a frequency.

In the case that a UE is receiving a communication service, the eNB may configure measurement to the UE for determining handover or transmission/reception power of the UE. The eNB may send the UE the measurement configuration information which may include measurement targets and measurement parameters (offset, threshold, etc.). If the measurement configuration is received, the UE performs measurement periodically and, if it is required to report based on the measurement result, reports the measurement result to the eNB.

Figure 10:
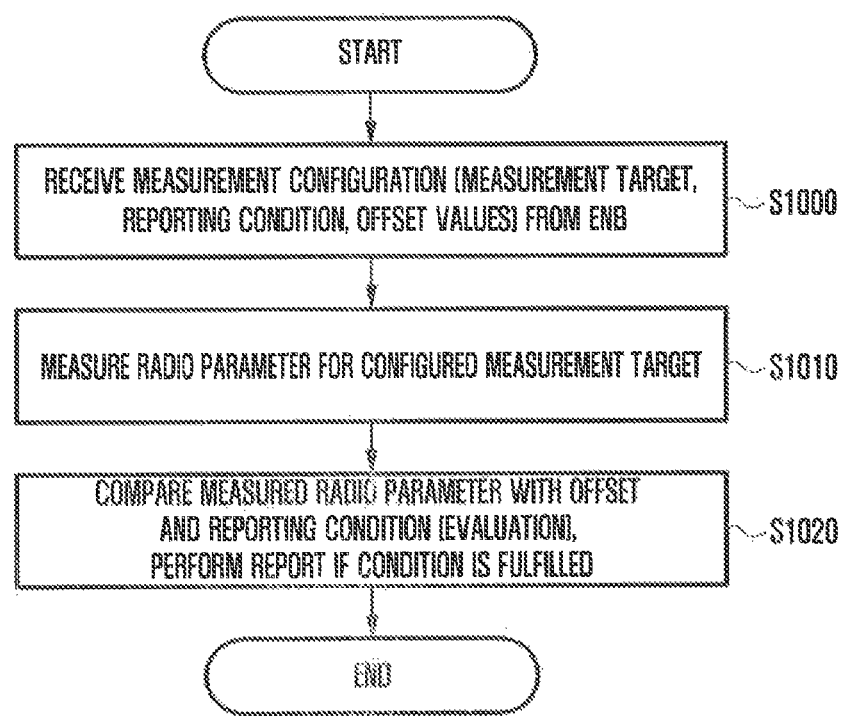
FIG. 10 is a flowchart illustrating a measurement procedure of a UE according to the measurement configuration.

FIG. 10 is a flowchart illustrating a measurement procedure of a UE according to the measurement configuration.

Referring to FIG. 10, the UE receives measurement configuration information from an eNB at step S1000. The measurement configuration information may include at least one measurement target (frequency/cell), at least one reporting condition (threshold value), and at least one offset value. The at least one offset value may include per-frequency offset for compensating the measurement result in consideration of per-frequency transmission characteristic, per-cell offset for compensating the measurement result in consideration of per-cell transmission characteristic, and hysteresis parameter.

The UE performs measurement based on the configured information at step S1010. That is, the UE measures the radio condition (or radio parameter) of the measurement target which may be expressed as Reference Signal Received Poser (RSRP) or Reference Signal Received Quality (RSRQ).

The UE compensates the measured radio condition using the offset included in the measurement configuration information and compares the compensation result with the report condition (threshold) to report, when the condition is fulfilled, the measurement result to the eNB at step S1020.

The above UE operation is capable of measuring the radio condition of the measurement target, compensating the measurement result, and reporting the compensated measurement result according to the measurement configuration; but it may increase the computation load of the UE resulting in increase of battery consumption because whenever the measurement is performed the measurement should be compensated.

In order to solve the above problem, an embodiment of the present invention proposes a method of reducing the calculation complexity of the UE in such a way that the UE calculates the threshold value to which the offset is applied per frequency or cell in advance in the step of receiving the measurement configuration information and uses the pre-calculated threshold value without compensation process in the step of actually measuring the measurement target and making a reporting decision.

Figure 11:
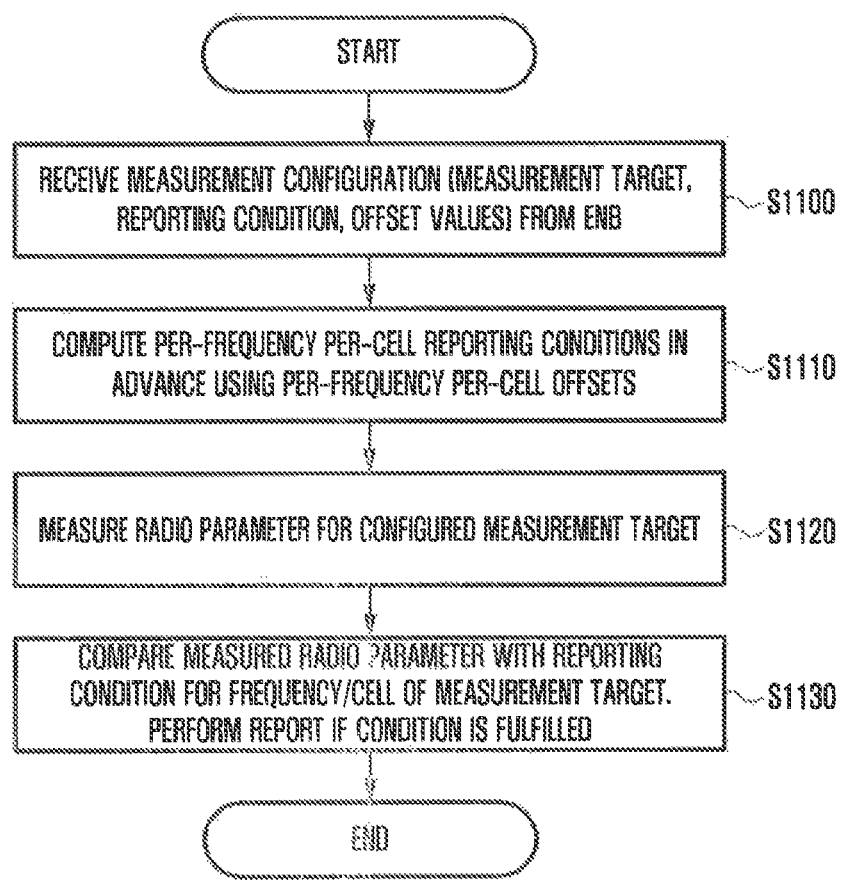
FIG. 11 is a flowchart illustrating a measurement process of a UE according to an embodiment of the present invention.

FIG. 11 is a flowchart illustrating a measurement process of a UE according to an embodiment of the present invention.

Referring to FIG. 11, the UE receives measurement configuration information from an eNB at step S1100. The measurement configuration information may include at least one measurement target (frequency/cell), at least one reporting condition (threshold value), and at least one offset value. The at least one offset value may include per-frequency offset for compensating the measurement result in consideration of per-frequency transmission characteristic, per-cell offset for compensating the measurement result in consideration of per-cell transmission characteristic, and hysteresis parameter.

In order to skip compensating the measurement value in the actual measurement process, the UE applies an offset to the report condition (e.g. threshold) upon receipt of the measurement configuration information and stores the computed report condition at step S1110. In detail, in the case that the report condition is a threshold, assuming that the measurement compensation information includes an offset for a specific frequency (V_f), an offset for a specific cell (V_c) and a threshold T for use in measurement, the UE calculates the threshold value per frequency and per cell as follows:

$$T(f,c)=T-V\_f-V\_c$$

and stores the threshold value for use in the next measurement process. If the measurement configuration information includes any of the offsets, the offset may not be applied to the threshold value calculation process. If the measurement configuration information includes the hysteresis, the hysteresis may be reflected to the threshold such that the equation may be modified as follows:

$$T(f,c)=T-V\_f-V\_c-\text{Hysteresis}$$

In the actual measurement process, the UE measures the radio condition of the measurement target at step S1120 and compares the measurement result with the threshold value calculated previously according to the frequency and cell information of the measurement target (e.g. assuming measurement targets of frequency f and cell c, T(f, c) among the stored values) to report, if the condition is fulfilled, the measurement result to the eNB at step S1130. In this procedure, the offset is not used.

In the case that the hysteresis is used as the report condition instead of the threshold, it is possible to store the result acquired by applying the hysteresis to the offset for use in determining, when measurement is performed afterward, whether to report the measurement using the stored hysteresis value along with the measurement value.

If it is required to measure the radio conditions of two or more cells to make a handover decision for the UE and report the measurement result, the UE has to measure the two or more measurement targets according to the measurement configuration. In this case, performing measurement on the two or more cells degrades measurement efficiency, e.g. increases power consumption.

An embodiment of the present invention proposes a method for reducing inefficiency in determining whether to report measurement results for two or more cells. The UE selects one of preference measurement targets according to the measurement configuration and interprets the threshold for the selected measurement target as the threshold for the condition of starting measurement on the second measurement target other than the threshold for reporting the measurement report. That is, the UE performs measurement on the selected first measurement target and, if the measurement result fulfils the condition of the threshold, skips measurement on the first measurement target during a predetermined period but performs measurement on the rest measurement target, i.e. the second measurement target. If the measurement result on the second measurement target fulfils the threshold for the second measurement during this period, the UE determines that reporting measurement result is necessary. If the predetermined period expires, the UE performs measurement on only the selected measurement target. That is, the situation in which measurement result report should be determined based on the measurement results for two or more measurement targets is changed such that measurement is always performed on one measurement target at a measurement timing, resulting in reduction of calculation complexity and power consumption of the UE.

Figure 12:
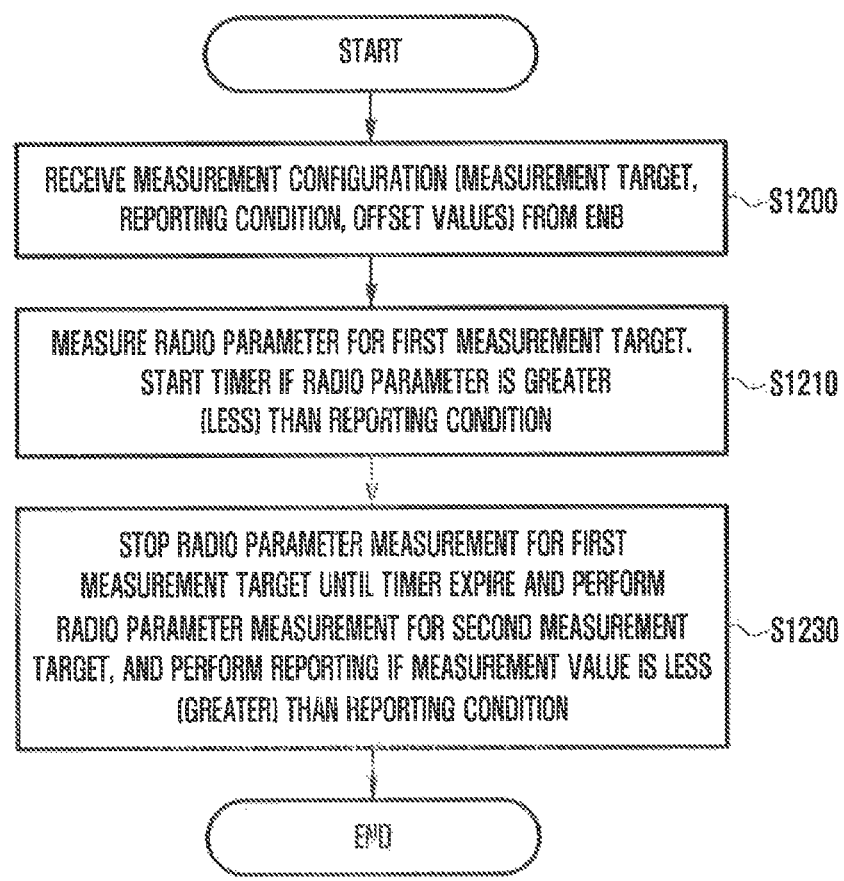
FIG. 12 is a flowchart illustrating an operation of the UE according to an embodiment of the present invention.

FIG. 12 is a flowchart illustrating an operation of the UE according to an embodiment of the present invention.

Referring to FIG. 12, the UE receives measurement configuration information from the eNB at step S1200. The measurement configuration information may include at least one measurement target (frequency/cell), at least one reporting condition (threshold value), and at least one offset value. The at least one offset value may include per-frequency offset for compensating the measurement result in consideration of per-frequency transmission characteristic, per-cell offset for compensating the measurement result in consideration of per-cell transmission characteristic, and hysteresis parameter.

In the case that the measurement report configuration should be performed based on the measurement results for two or more cells (e.g. measurement result report starts when the RSRP of a cell to which the UE connects is equal to or less than T1 and the RSRP of a neighbor cell is equal to or greater than T2), the UE does not perform measurement on all of the plural measurement targets. Although the description is directed to an embodiment of the present invention in which the measurement results for two cells are used herein, the present invention can be applied to the cases of using the measurement results for more than two cells with a slight modification without departing from the spirit and scope of the present invention. Upon receipt of the measurement configuration information, the UE selects a measurement target first instead of performing measurement on the two measure targets, and the threshold for the selected measurement target is used to determine whether to start a timer other than whether to report measurement result. The UE may select one of the measurement targets based on preconfigured priorities thereof or certain information included in the measurement configuration information or randomly. For example, the UE may perform measurement on the primary cell or serving cell with priority in comparison with neighbor cells. The UE may continue measuring the first measurement target and, if the radio condition of the selected first cell fulfils the threshold, starts the timer at step S1210. While the timer is running, the UE measures the radio condition of the second measurement target other than that of the first measurement target at step S1230. If the measurement result of the second measurement target fulfils the threshold, the UE performs an operation to report the measurement report to the eNB. If the timer expires, the UE stops measurement on the second measurement target and resumes measurement on the first measurement target.

As described above, the UE needs to perform measurement on one measurement target at a measurement time so as to reduce measurement load and power consumption.

The measurement accuracy and measurement result report time are associated with the network throughput as well as the UE capability and battery lifespan, it is effective to report the measurement result to the UE only when the measurement accuracy is high and the measurement result is requested as far as possible. In order to accomplish this, an embodiment of the present invention proposes a method of compensating, at the UE, the measurement result report condition (e.g. threshold) included in the measurement configuration information received from the eNB in adaptation to the condition of the UE in real time. That is, the UE performs measurement according to the measurement configuration and determines whether to report the measurement result about the measurement target based on the condition updated in real time other than the given report condition (e.g. threshold) as it is. For example, the UE may adjust the report condition in real time in adaptation to the mobility of the UE or adjust the report condition by generating a small random number to reduce probability of handover conflict when the UEs located in the same area report measurement results simultaneously.

Figure 13:
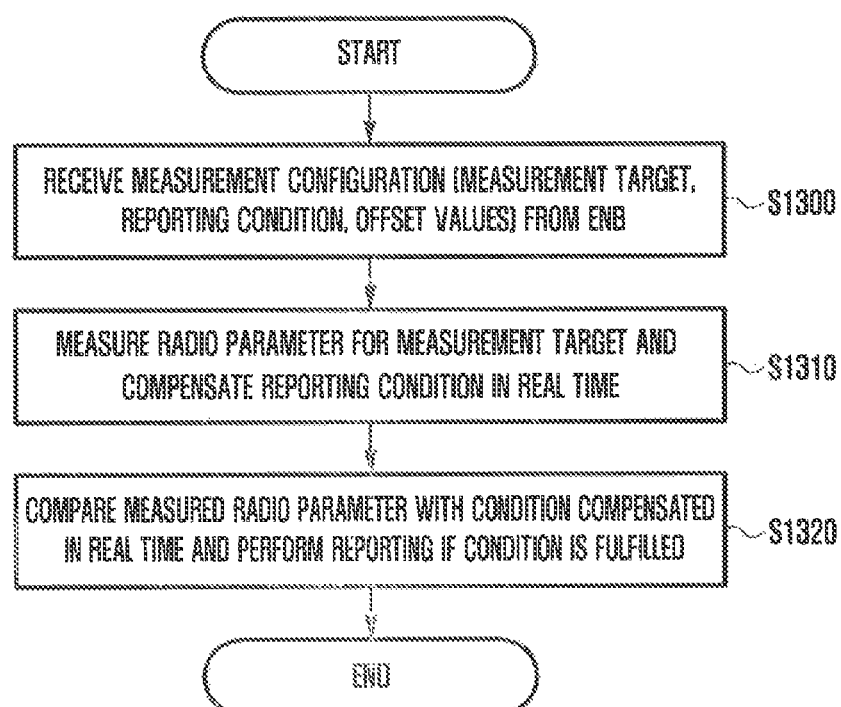
FIG. 13 is a flowchart illustrating an operation of a UE according to an embodiment of the present invention.

FIG. 13 is a flowchart illustrating an operation of a UE according to an embodiment of the present invention.

Referring to FIG. 13, the UE receives measurement configuration information from an eNB at step S1300. The measurement configuration information may include at least one measurement target (frequency/cell), at least one reporting condition (threshold value), and at least one offset value. The at least one offset value may include per-frequency offset for compensating the measurement result in consideration of per-frequency transmission characteristic, per-cell offset for compensating the measurement result in consideration of per-cell transmission characteristic, and hysteresis parameter.

The UE performs measurement according to the configuration at step S1310. The UE measures the radio condition (or radio parameter) of the measurement target, and the radio condition may be Reference Signal Received Power (RSRP) or Reference Signal Received Quality (RSRQ). At this time, the UE may use a reporting condition (e.g. threshold) included in the measurement configuration information to determine whether to report measurement result. In order to reflect the real time condition of the UE or accomplish the supplementary effect to avoid concentration of handover at a specific area as described above, the UE may update the reporting condition in real time. The adjustment scale of the reporting condition may be determined in proportion or inversely proportion to the condition of the UE. In the case of measuring the radio condition of the serving or primary cell, if the UE has a high mobility, it determines that the handover probability is high and then changes the threshold value received through the measurement configuration information to a smaller value in proportion to the mobility. In order to prevent the measurement results from being concentrated temporarily, the UE may add a relatively small negative or positive value generated randomly to the threshold value. The UE compares the measurement result with the adjusted measurement report condition and, if a predetermined condition is fulfilled, reports the measurement result to the eNB at step S1320.

If the measurement configuration includes a plurality of reporting conditions, the UE may perform measurement with only one of the plural conditions. For example, if it is necessary to perform measurement on two measurement targets and report the measurement results, although the measurement configuration includes the measurement reporting conditions different for the respective measurement targets, the UE selects one of the measurement reporting conditions and applies the measurement reporting condition to both the measurement targets to determine whether to report measurement result.

Figure 14:
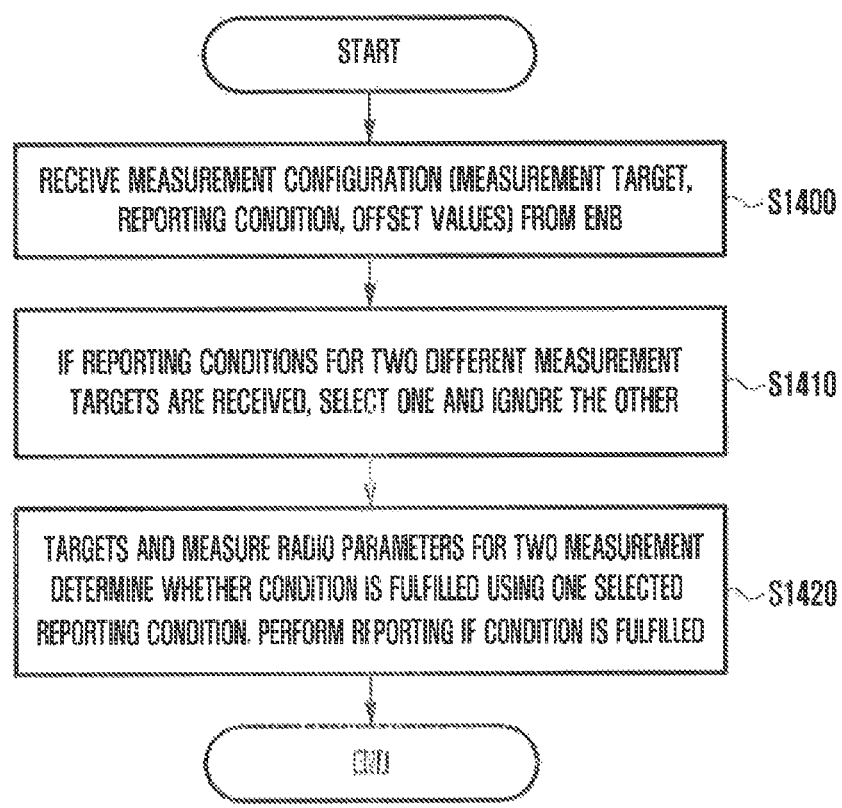
FIG. 14 is a flowchart illustrating an operation of a UE according to an embodiment of the present invention.

FIG. 14 is a flowchart illustrating an operation of a UE according to an embodiment of the present invention.

Referring to FIG. 14, the UE receives measurement configuration information from an eNB at step S1400. The measurement configuration information may include at least one measurement target (frequency/cell), at least one reporting condition (threshold value), and at least one offset value. The at least one offset value may include per-frequency offset for compensating the measurement result in consideration of per-frequency transmission characteristic, per-cell offset for compensating the measurement result in consideration of per-cell transmission characteristic, and hysteresis parameter.

In the case that the measurement report configuration should be performed based on the measurement results for two or more cells (e.g. measurement result report starts when the RSRP of a cell to which the UE connects is equal to or less than T1 and the RSRP of a neighbor cell is equal to or greater than T2), the UE does not perform measurement on all of the plural measurement targets. Although the description is directed to an embodiment of the present invention in which the measurement results for two cells are used herein, the present invention can be applied to the cases of using the measurement results for more than two cells with a slight modification without departing from the spirit and scope of the present invention. Upon receipt of the measurement configuration information, the UE selects one of the measurement report conditions for the two measurement targets for use afterward at step S1410. The UE may select one of the two measurement report conditions based on preconfigured priorities thereof or certain information included in the measurement configuration information or randomly. For example, the UE may use the reporting condition for the primary or serving cell for measurement on the neighbor cell instead of the reporting condition for the neighbor cell. Once one reporting condition is selected in this way, the UE uses the selected reporting condition to be compared with the measurement results of the plural cells. For example, if the measurement configuration instructs to report the measurement results when the measurement result of the primary or serving cell is less than T1 and if the measurement result of the neighbor cell I is greater than T2, the UE uses only T1 but not T2 to report the measurement result when the measurement result of the primary or serving cell is less than T1 and the measurement result of the neighbor cell is greater than T1 at step S1420.

Figure 15:
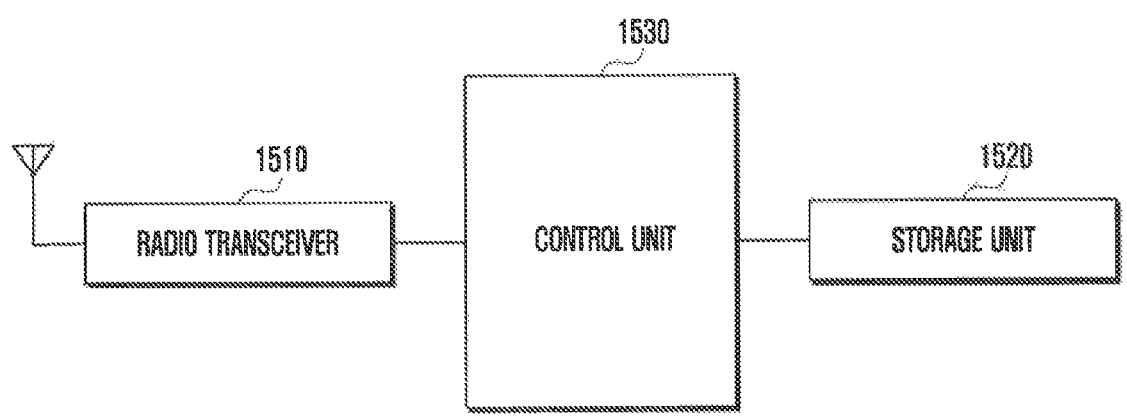
FIG. 15 is a block diagram illustrating a configuration of a UE according to an embodiment of the present invention.

FIG. 15 is a block diagram illustrating a configuration of a UE according to an embodiment of the present invention.

Referring to FIG. 15, the UE according to the present invention includes a radio transceiver 1510, a storage unit 1520, and a control unit 1530.

The radio transceiver 1510 is responsible for the function of transmitting/receiving data for radio communication of the UE. The radio transceiver 1510 may include an RF transmitter for up-converting and amplifying the transmission signal and an RF receiver for low noise amplifying and down-converting the received signal. The radio transceiver 1510 may also output the data received through the radio channel to the control unit 1530 and transmit the data output from the control unit 1530 through the radio channel.

The storage unit 1520 stores programs and data associated with the operation of the UE. Particularly, the storage unit may store the reporting condition (threshold) adjusted by reflecting the offset value as described in the above embodiments (embodiments of FIGS. 10 to 14).

The control unit 1530 controls signal flows among the blocks in order for the UE to operate according to an embodiment of the present invention.

The control unit 1530 may also control the UE to operate according to other embodiments of the present invention as well as the above-described embodiments.

The steps or conditions described in the above embodiments with reference to FIGS. 10 to 14 may be used in a combined manner. For example, step S1110 of FIG. 11 may be included in the procedure of FIG. 12 and, at step S1230 of FIG. 12, the UE retrieves and compares the threshold values which have been calculated and stored according to the frequency and cell information of the measurement targets (e.g. assuming the frequency f and cell c as the measurement target, use T(f, c) among the stored values) and, if a condition is fulfilled, reports the measurement result to the eNB.

In the above described embodiments, all of the steps may be performed or omitted selectively. In each embodiment, the steps are not necessary to be performed in the sequential order as depicted but may be performed in a changed order.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method by a terminal configured to use circuit switched fall back in a mobile communication system, comprising:
    initiating a call based on an IP multimedia subsystem (IMS) voice over packet switched (IMS VoPS);
    transmitting a tracking area update (TAU) request message in a tracking area, wherein the TAU request message includes network update information of combined tracking area and location area updating;
    receiving a TAU accept message including network support information on whether a network supports the IMS VoPS and network update result information on whether tracking area updating for evolved packet system (EPS) service and location area updating for non-EPS service are successful;
    maintaining, until an established bearer associated with the call is released, a context of the bearer associated with the call based on the network support information;
    identifying that the bearer associated with the call is released; and
    attempting to select a global system for mobile communications (GSM) edge radio access network (GERAN) or a universal mobile telecommunications service (UMTS) terrestrial radio access network (UTRAN) and disabling an evolved UMTS terrestrial radio access network (E-UTRAN) function, based on the network support information and the network update result information, in case that a number of TAU attempt is equal to a predetermined value, wherein the number of the TAU attempt is a number of transmissions of TAU request message including the network update information of combined tracking area and location area updating,
    wherein a transmission of the TAU request message is triggered again, in case that the TAU accept message is received in response to the TAU request message and includes the network support information indicating that the IMS VoPS is not supported by the network and the network update result information indicating that the tracking area updating is successful and the location area updating is not successful.

2. The method of claim 1, wherein the TAU request message is transmitted when the tracking area is not registered.

3. The method of claim 1, wherein the TAU request message is transmitted in order for the terminal attached for evolved packet system (EPS) service to perform an attach procedure for non-EPS services.

4. A terminal configured to use circuit switched fall back in a mobile communication system, the terminal comprising:
    a transceiver; and
    a controller coupled with the transceiver and configured to control to:
        initiate a call based on an IP multimedia subsystem (IMS) voice over PS (IMS VoPS),
        transmit a tracking area update (TAU) request message in a tracking area, wherein the TAU request message includes network update information of combined tracking area and location area updating,
        receive a TAU accept message including network support information on whether a network supports the IMS VoPS and network update result information on whether tracking area updating for evolved packet system (EPS) service and location area updating for non-EPS service are successful,
        maintain, until an established bearer associated with the call is released, a context of the bearer associated with the call based on the network support information,
        identify that the bearer associated with the call is released, and
        attempt to select a global system for mobile communications (GSM) edge radio access network (GERAN) or a universal mobile telecommunications service (UMTS) terrestrial radio access network (UTRAN) and disable an evolved UMTS terrestrial radio access network (E-UTRAN) function, based on the network support information and the network update result information, in case that a number of TAU attempt is equal to a predetermined value, wherein the number of the TAU attempt is a number of transmissions of TAU request message including the network update information of combined tracking area and location area updating,
    wherein a transmission of the TAU request message is triggered again, in case that the TAU accept message is received in response to the TAU request message and includes the network support information indicating that the IMS VoPS is not supported by the network and the network update result information indicating that the tracking area updating is successful and the location area updating is not successful.

5. The terminal of claim 4, wherein the TAU request message is transmitted when the tracking area is not registered.

6. The terminal of claim 4, wherein the TAU request message is transmitted in order for the terminal attached for evolved packet system (EPS) service to perform an attach procedure for non-EPS services.

* * * * *